Figure 1:
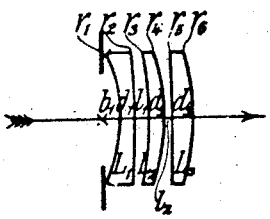

No. 660,202. Patented Oct. 23, 1900.
P. RUDOLPH.
PHOTOGRAPHIC OBJECTIVE.
(Application filed Jan. 2, 1900.)

(No Model.)

Witnesses:
E Dimity
Paul Krüger

Inventor:
Paul Rudolph

UNITED STATES PATENT OFFICE.

PAUL RUDOLPH, OF JENA, GERMANY, ASSIGNOR TO THE FIRM CARL ZEISS, OF SAME PLACE.

PHOTOGRAPHIC OBJECTIVE.

SPECIFICATION forming part of Letters Patent No. 660,202, dated October 23, 1900.

Application filed January 2, 1900. Serial No. 160. (No model.)

*To all whom it may concern:*

Be it known that I, PAUL RUDOLPH, doctor of philosophy, a subject of the Duke of Saxe-Altenburg, residing at Jena, in the Grand Duchy of Saxe-Weimar-Eisenach, German Empire, have invented a new and useful Photographic Objective, of which the following is a specification.

The photographic objective hereinafter described has been devised for purposes which require a large aperture and an anastigmatically-flattened field for a comparatively large angle. The advantage of this objective as compared with combinations hitherto known for similar purposes—for instance, the objectives described in Patent No. 444,714 and like anastigmatic constructions—is that the choice of glasses is hardly limited and less lenses are necessary to obtain good spherical correction even in types of high aperture. This double advantage of the new objective is due to the use of two pairs of glass surfaces, each pair consisting of two surfaces which face one another—that is to say, which belong to two consecutive lenses and are separated by an air-space, but not by the diaphragm of the system, and the powers of both pairs being of opposite sign.

If $n_1$ and $n_2$ be the refractive indices of the two consecutive lenses and $r_i$ and $r_k$ the radii of curvature of the glass surfaces facing one another, the power of such a pair of surfaces is given by $$\varphi 1.2 = -\frac{n_1-1}{r_i} + \frac{n_2-1}{r_k},$$

the axial thickness of the air-space between both "facing" surfaces being supposed to be negligible.

There exist already several photographic objectives having two pairs of facing glass surfaces separated by air; but the powers of these pairs are both positive or both negative. It may be inferred from Fig. 3 of Patent No. 583,336, relating to the so-called "Planar," that the two pairs of facing glass surfaces are the surfaces $r_4'\ r_3'$ and $r_2\ r_4$ of the lenses $L_3\ L_2$ and $L_2\ L_3$, respectively. The sign of the power of each pair is positive. Another construction of this kind has been described in the English specification No. 12,859, A. D. 1898. This ojective is composed of four separate parts and contains, according to the data given in M. von Rohr's *Theorie und Geschichte des Photographischen Objectivs*, (Theory and History of the Photographic Objective,) p. 392, two pairs of facing glass surfaces, each of which pairs has a negative power.

The effect of combining two pairs of facing surfaces of opposite power is similar to the result obtained in the objective described in Patent No. 444,714 by the opposite sign prescribed for the difference between the refractive indices of the crown and flint lenses in the cemented components of a doublet. The pairs of facing surfaces produce, in accordance with the signs of their powers, astigmatic differences of opposite character, so that in addition to spherical correction of the whole system and flattening of the image astigmatism may fully be corrected. In the former objective the maximum difference of the refractive indices of the lenses cemented together was (with regard to practical usefulness of the glasses) $1.63 - 1.50 = 0.13$. In the present objective, however, the difference of the refractive indices belonging to each of the facing glass surfaces will amount to $1.50 - 1.00 = 0.50$ even in the most unfavorable case. It is further to be considered that when the present objective has the same number of lenses as the former its number of elements available for correction is increased, so that the present objective when consisting of four lenses presents a surplus of two radii and two air-spaces.

From the foregoing it will be understood that the adoption of the new type of objective will result either in larger apertures, the spherical corrections remaining of the same quality, or, when the apertures are unaltered, in improved spherical corrections.

Besides the two pairs of facing glass surfaces of opposite sign the well-known means of correction may be employed at will, and in consequence thereof the new objective may consist of single lenses as well as of cemented-lens systems. Moreover, it is an essential feature of the invention that the selection of kinds of glass is nearly unlimited, so that glasses which diminish the secondary spectrum may be used, although their optical properties vary in very narrow limits only.

The features of the invention may be realized either in "simple objectives" (objectives having the diaphragm behind or in front of them) or in "doublets," (objectives in which the diaphragm is placed within the system.)

Figure 2:
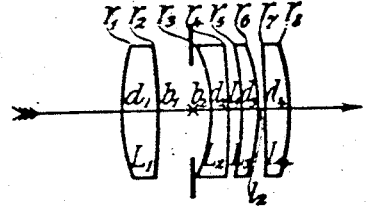
Figure 3:
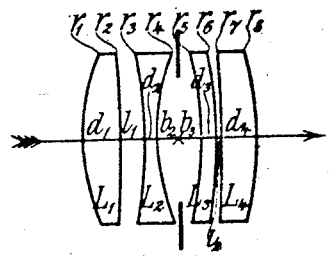
Figure 4:
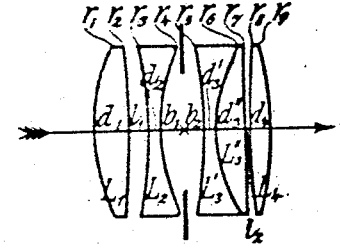
Figure 5:
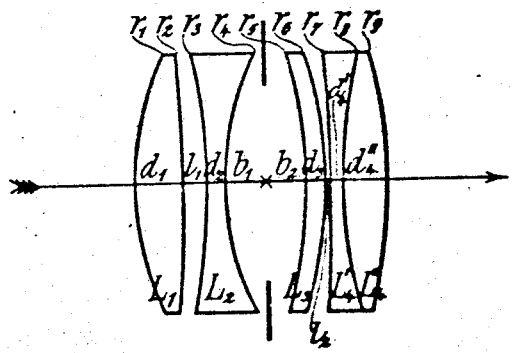

In the annexed drawings, Figure 1 represents a simple objective constructed according to the invention. Fig. 2 represents a doublet, one of the two components of which is constructed according to the invention. Fig. 3 represents a doublet constructed according to the invention. Fig. 4 represents another doublet constructed according to the invention. Fig. 5 represents a third doublet constructed according to the invention.

The most primitive simple objective consists of three single lenses $L_1$ $L_2$ $L_3$, placed separately, as shown in Fig. 1. One pair of facing glass surfaces is formed by the surfaces $r_2$ $r_3$ of the lenses $L_1$ $L_2$ and the other by the surfaces $r_4$ $r_5$ of the lenses $L_2$ $L_3$. For each of the single elements $L_1$ $L_2$ $L_3$ a compound-lens or a non-cemented-lens system may be substituted, whereby the construction of the simple objective becomes more or less complicated. Such a simple objective may also advantageously be used as a component of unsymmetrical as well as hemi or holo symmetrical doublets. The most primitive kind of an unsymmetrical doublet, a component of which is a simple objective constructed according to the invention, is shown in Fig. 2. It consists of four lenses $L_1$ $L_2$ $L_3$ $L_4$, the back component $L_2+L_3+L_4$ being the simple objective shown in Fig. 1; but it will be understood that the simple objective may also be used as the front component of the doublet.

The most primitive doublet, which in its totality is constructed according to the invention, has two lenses in front of the diaphragm and two lenses behind it, as shown in Fig. 3, the two pairs of facing surfaces being placed on different sides of the diaphragm. The surfaces $r_2$ $r_3$ of the lenses $L_1$ $L_2$ form the one pair having positive power and the surfaces $r_6$ $r_7$ of the lenses $L_3$ $L_4$ the other pair having negative power. The lenses $L_1$ $L_2$ $L_3$ $L_4$ may be single lenses, as shown, or compound lenses. It will be preferable to substitute compound for some of the single lenses either for the purpose of remaining within certain limits as to the choice of glasses or for obtaining certain effects as regards the correction of chromatic or spherical aberrations. According to the particular purposes of each doublet the elements of such a composite lens may be made of glasses having the same refraction and different dispersion or the same dispersion and different refraction or different refraction and different dispersion.

In Fig. 4 a more complicated doublet is shown, which has been developed from the doublet represented in Fig. 3 by substituting two elements $L_3'$ and $L_3''$, cemented together for the lens $L_3$. Example 3, given below and showing detailed data of construction, refers to the same. Fig. 4. In this example $L_3'$ and $L_3''$ are ground from glasses having the same refraction but different dispersion, so as to chromatically correct the whole system.

Finally, in Fig. 5 a construction is represented in which for the lens $L_4$ of Fig. 3 a compound consisting of $L_4'$ and $L_4''$ has been substituted. In the Example 4, which gives detailed data of construction in reference to Fig. 5, glasses of different dispersion and different refraction have been selected, by means of which the chromatic correction as well as the diminution of the spherical zones are obtained.

In the following numerical examples of objectives constructed according to the invention the letters $L_1$ $L_2$ denote the lenses; $d_1$ $d_2$, their axial thicknesses; $r_1$ $r_2$, the radii of curvature of their spherical surfaces; $b_1$ $b_2$, the distances between the diaphragm and the adjacent lens vertices; $l_1$ $l_2$, the axial thicknesses of the air-spaces between two lenses, (the distances between two lenses.) The radii, thicknesses, diameters, and distances are expressed by proportional numbers, the unity of which is the focal length of the entire objective. By simply multiplying these numbers with the focal length required in each case the data of construction for any objective wanted will be obtained. The different kinds of glass are determined by their refractive indices $n_D$, $n_F$, and $n_{G1}$, relating to the D-line and the F-line of the solar spectrum and to the Hγ-line of the hydrogen spectrum, respectively. The value of $\frac{\Delta n}{n_D - 1}$ indicates the relative dispersive power of the kind of glass, $\Delta n$ being given for the interval between D and Hγ, whereas by the quotients $$\frac{n_F - n_D}{n_{G1} - n_D}$$

and $$\frac{n_{G1} - n_F}{n_{G1} - n_D}$$

the increase of the dispersion in the considered interval is shown.

Example 1, Fig. 1: Spherically and chromatically corrected simple objective in which the anastigmatic flatness of the field is nearly obtained: The objective consists of three single lenses $L_1$ $L_2$ $L_3$, of which $L_1$ is a dispersing lens, while $L_2$ and $L_3$ are collective lenses. The two pairs of facing glass surfaces consist of the surfaces $r_2$ $r_3$ of the lenses $L_1$ $L_2$ and $r_4$ $r_5$ of the lenses $L_2$ $L_3$. The focal length is 1. The highest relative aperture available is 0.125.

| Radii. | Thicknesses and distances. |
|---|---|
| $r_1 = -0.145$ | $b_1 = 0.015$ |
| $r_2 = -0.967$ | $d_1 = 0.007$ |
| $r_3 = -0.339$ | $l_1 = 0.010$ |
| $r_4 = -0.189$ | $d_2 = 0.015$ |
| $r_5 = -2.418$ | $l_2 = 0.005$ |
| $r_6 = -0.214$ | $d_3 = 0.019$ |

Kinds of Glass.

| | $L_1$ | $L_2$ | $L_3$ |
|---|---|---|---|
| $n_D$ | 1.57740 | 1.51790 | 1.61232 |
| $n_F$ | 1.58734 | 1.52396 | 1.61996 |
| $n_{G1}$ | 1.59571 | 1.52884 | 1.62614 |
| $\dfrac{\Delta n}{n_D - 1}$ | 0.03171 | 0.02112 | 0.02257 |
| $\dfrac{n_F - n_D}{n_{G1} - n_D}$ | 0.543 | 0.554 | 0.553 |
| $\dfrac{n_D - n_{G1}}{n_{G1} - n_D}$ | 0.457 | 0.446 | 0.447 |

Powers of the Pairs of Facing Surfaces for $n_D$.

$$\varphi 1.2 = -\frac{0.57740}{-0.967} + \frac{0.51790}{-0.339} = -0.931$$

$$\varphi 2.3 = -\frac{0.51790}{-0.189} + \frac{0.61232}{-2.418} = +2.487$$

Example 2, Fig. 3: Spherically and chromatically corrected doublet having an anastigmatically-flattened field: The objective consists of four single lenses $L_1$ $L_2$ $L_3$ $L_4$, $L_1$ and $L_4$ being collective lenses and $L_2$ and $L_3$ dispersive lenses. The two pairs of facing glass surfaces consist of the surfaces $r_2$ $r_3$ of the lenses $L_1$ $L_2$ and $r_6$ $r_7$ of the lenses $L_3$ $L_4$. The focal length is 1. The highest relative aperture available is 0.166.

| Radii. | Thicknesses and distances. |
|---|---|
| $r_1 = +0.207$ | $d_1 = 0.035$ |
| $r_2 = -1.174$ | $l_1 = 0.021$ |
| $r_3 = -0.463$ | $d_2 = 0.014$ |
| $r_4 = +0.211$ | $b_1 = 0.021$ |
| $r_5 = -0.345$ | $b_2 = 0.021$ |
| $r_6 = -0.463$ | $d_3 = 0.014$ |
| $r_7 = -1.726$ | $l_2 = 0.001$ |
| $r_8 = -0.314$ | $d_4 = 0.035$ |

Kinds of Glass.

| | $L_1$ | $L_2$ | $L_3$ | $L_4$ |
|---|---|---|---|---|
| $n_D$ | 1.59119 | 1.57970 | 1.51147 | 1.61091 |
| $n_F$ | 1.59800 | 1.58953 | 1.51710 | 1.61852 |
| $n_{G1}$ | 1.60344 | 1.59779 | 1.52159 | 1.62469 |
| $\dfrac{\Delta n}{n_D - 1}$ | 0.02072 | 0.03120 | 0.01979 | 0.02226 |
| $\dfrac{n_F - n_D}{n_{G1} - n_D}$ | 0.556 | 0.544 | 0.556 | 0.552 |
| $\dfrac{n_{G1} - n_F}{n_{G1} - n_D}$ | 0.444 | 0.457 | 0.444 | 0.448 |

Powers of the Pairs of Facing Surfaces for $n_D$.

$$\varphi 1.2 = -\frac{0.59119}{-1.174} + \frac{0.57970}{-0.463} = -0.749$$

$$\varphi 3.4 = -\frac{0.51147}{-0.463} + \frac{0.61091}{-1.726} = +0.746$$

Example 3, Fig. 4: Spherically and chromatically corrected doublet having an anastigmatically-flattened field and a diminished secondary spectrum: The objective consists of five lenses $L_1$ $L_2$ $L_3'$ $L_3''$ $L_4$, of which $L_3'$ and $L_3''$ are cemented together. $L_1$ and $L_4$ are collective lenses. $L_2$ and $L_3' + L_3''$ are dispersive lenses. The two pairs of facing surfaces consist of the surfaces $r_2$ $r_3$ of the lenses $L_1$ $L_2$ and $r_7$ $r_8$ of the lenses $L_3''$ $L_4$. The diaphragm is located between the lenses $L_2$ and $L_3'$. The focal distance is 1. The highest relative aperture available is 0.166.

| Radii. | Thicknesses and distances. |
|---|---|
| $r_1 = +0.194$ | $d_1 = 0.032$ |
| $r_2 = -0.971$ | $l_1 = 0.016$ |
| $r_3 = -0.421$ | $d_2 = 0.013$ |
| $r_4 = +0.194$ | $b_1 = 0.019$ |
| $r_5 = -0.485$ | $b_2 = 0.019$ |
| $r_6 = +0.142$ | $d_3' = 0.010$ |
| $r_7 = \infty$ | $d_3'' = 0.029$ |
| $r_8 = +1.618$ | $l_2 = 0.001$ |
| $r_9 = -0.314$ | $d_4 = 0.016$ |

Kinds of Glass.

| | $L_1 = L_3''$ | $L_2 = L_3'$ | $L_4$ |
|---|---|---|---|
| $n_D$ | 1.52655 | 1.52149 | 1.61210 |
| $n_F$ | 1.53259 | 1.52859 | 1.61945 |
| $n_{G1}$ | 1.53747 | 1.53436 | 1.62539 |
| $\dfrac{\Delta n}{n_D - 1}$ | 0.02074 | 0.02468 | 0.02171 |
| $\dfrac{n_F - n_D}{n_{G1} - n_D}$ | 0.553 | 0.552 | 0.553 |
| $\dfrac{n_{G1} - n_F}{n_{G1} - n_D}$ | 0.447 | 0.448 | 0.447 |

Powers of the Pairs of Facing Surfaces for $n_D$.

$$\varphi 1.2 = -\frac{0.52655}{-0.971} + \frac{0.52149}{-0.421} = -0.696$$

$$\varphi 3.4 = 0 + \frac{0.61210}{1.618} = +0.378$$

Example 4, Fig. 5: Spherically and chromatically corrected doublet having an anastigmatically-flattened field: The objective consists of three collective lenses $L_1$ $L_3$ $L_4' + L_4''$ and a dispersive lens $L_2$. The two pairs of facing glass surfaces consist of the surfaces $r_2$ $r_3$ of the lenses $L_1$ $L_2$ and $r_6$ $r_7$ of the lenses $L_3$ $L_4'$. The diaphragm is placed between the lenses $L_2$ and $L_3$. The focal length is 1. The highest relative aperture available is 0.25.

| Radii. | Thicknesses and distances. |
|---|---|
| $r_1 = +0.281$ | $d_1 = 0.047$ |
| $r_2 = -1.874$ | $l_1 = 0.023$ |
| $r_3 = -0.628$ | $d_2 = 0.019$ |
| $r_4 = +0.286$ | $b_1 = 0.038$ |
| $r_5 = -0.469$ | $b_2 = 0.038$ |
| $r_6 = -0.422$ | $d_3 = 0.019$ |
| $r_7 = -2.343$ | $l_2 = 0.002$ |
| $r_8 = +0.506$ | $d_4' = 0.014$ |
| $r_9 = -0.506$ | $d_4'' = 0.033$ |

*Kinds of Glass.*

|  | $L_1 = L_4''$ | $L_2 = L_3 = L_4'$ |
|---|---|---|
| $n_D$ | 1.61091 | 1.57311 |
| $n_F$ | 1.61852 | 1.58264 |
| $n_{G_1}$ | 1.62469 | 1.59063 |
| $\dfrac{\Delta n}{n_D - 1}$ | 0.02256 | 0.03057 |
| $\dfrac{n_F - n_D}{n_{G_1} - n_D}$ | 0.552 | 0.544 |
| $\dfrac{n_{G_1} - n_F}{n_{G_1} - n_D}$ | 0.448 | 0.456 |

*Powers of the Pairs of Facing Surfaces for $n_D$.*

$$\varphi 1.2 = -\frac{0.61091}{-1.874} + \frac{0.57311}{-0.628} = -0.586$$

$$\varphi 3.4 = -\frac{0.57311}{-0.422} + \frac{0.57311}{-2.343} = +1.113$$

What I claim as my invention, and desire to secure by Letters Patent of the United States, is—

A spherically and chromatically corrected objective having an anastigmatically-flattened field and consisting of at least three separate lenses so as to include at least two air-spaces, in which objective two of the air-spaces are separated from the diaphragm each by at least one lens and confined one by a pair of glass surfaces the power of which is positive and the other by a pair of glass surfaces the power of which is negative, essentially as described.

In testimony whereof I have hereunto set my hand in the presence of two subscribing witnesses.

PAUL RUDOLPH.

Witnesses:
 PAUL TRICHMANN,
 LINA JARZ.